US008660584B2

(12) United States Patent
Furusawa

(10) Patent No.: US 8,660,584 B2
(45) Date of Patent: Feb. 25, 2014

(54) EQUIPMENT MANAGING SYSTEM, TERMINAL DEVICE, AND LOCATION INFORMATION DISPLAYING METHOD

(75) Inventor: Naoki Furusawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 81 days.

(21) Appl. No.: 12/979,600

(22) Filed: Dec. 28, 2010

(65) Prior Publication Data

US 2011/0223941 A1 Sep. 15, 2011

(30) Foreign Application Priority Data

Mar. 11, 2010 (JP) .................................. 2010-054198

(51) Int. Cl.
*H04W 24/00* (2009.01)
(52) U.S. Cl.
USPC ..................... 455/456.6; 455/457; 455/456.1; 455/517; 455/550.1; 455/566
(58) Field of Classification Search
USPC ......... 455/456.6, 457, 456.1, 517, 550.1, 566
See application file for complete search history.

(56) References Cited

U.S. PATENT DOCUMENTS

2004/0203906 A1* 10/2004 Kato et al. ................. 455/456.1
2005/0097479 A1* 5/2005 Takabe et al. ................. 715/851
2007/0123249 A1* 5/2007 Sun .............................. 455/423

FOREIGN PATENT DOCUMENTS

| CN | 101325784 A | 12/2008 |
| JP | 2001-59740 A | 3/2001 |
| JP | 2001059740 A | * 3/2001 |
| JP | 2003-134261 A | 5/2003 |
| JP | 2004-320209 A | 11/2004 |
| JP | 2006-099651 A | 4/2006 |
| JP | 2006-234418 A | 9/2006 |

OTHER PUBLICATIONS

Japanese Office Action dated May 28, 2013, which issued during the prosecution of Japanese Patent Application No. 2010-054198.
Chinese Office Action dated Jul. 12, 2013, which issued during the prosecution of Chinese Patent Application No. 201010613353.0.

* cited by examiner

*Primary Examiner* — Khai M Nguyen
(74) *Attorney, Agent, or Firm* — Troutman Sanders LLP

(57) ABSTRACT

Equipment information including an installation height, which is an elevation, is stored as equipment information in an equipment management DB as location information for the location wherein an applicable piece of equipment is installed, and in a terminal device, the equipment information for the applicable equipment is acquired from the equipment management DB by a location information displaying unit in response to a display request operation, and a differential height, acquired through subtracting the current height, detected by a height detecting unit, from the installation height of the equipment, included in the equipment information that was acquired, is displayed on the screen of a screen displaying unit.

13 Claims, 6 Drawing Sheets

| Equipment ID | V002 |
|---|---|
| Node Number | 23 |
| Segment Number | 15 |
| Node Address | 0 x F 6 |
| Latitude | N 35° 43' 23.00" |
| Longitude | E 140° 49' 0.4 .40" |
| Height | 23.56 m |
| ... | ... |

Installation Location Information (brace covering Latitude, Longitude, Height)

| Equipment ID | V002 |
|---|---|
| Node Number | 23 |
| Segment Number | 15 |
| Node Address | 0 x F 6 |
| Latitude | N 35° 43' 23.00" |
| Longitude | E 140° 49' 0.4 .40" |
| Height | 23.56 m |
| Floor Height | 7.19 m |
| ... | ... |

Installation Location Information (Latitude, Longitude, Height, Floor Height)

EQUIPMENT MANAGING SYSTEM, TERMINAL DEVICE, AND LOCATION INFORMATION DISPLAYING METHOD

CROSS REFERENCE TO RELATED APPLICATIONS

The present application claims priority under 35 U.S.C. §119 to Japanese Patent Application No. 2010-054198, filed Mar. 11, 2010, which is incorporated herein by reference.

FIELD OF TECHNOLOGY

The present invention relates to an equipment managing technology, and, in particular, relates to an equipment information displaying technology for displaying equipment information relating to individual equipment provided in a facility.

BACKGROUND OF THE INVENTION

In facilities such as industrial systems and buildings, various types of equipment, such as field equipment, remote I/O, power supply units, controllers, operator consoles, and the like, are used, and in facilities of a relatively large scope, such as a petrochemical plant or a building, many devices are installed across a broad area.

In consideration of maintenance for this equipment, equipment information for each equipment, such as equipment identification information and model type, established at the time of facilities planning, along with the installation date, maintenance records, and the like, for each piece of equipment, is managed in an equipment management database.

When performing maintenance on the equipment, the maintenance technician must actually go to the installation location of the equipment to perform the servicing. Because of this, it is necessary to be able to specify easily the installation location of the applicable equipment. It is particularly difficult to specify precisely the installation location of the equipment if maintenance of the equipment has not been performed for a long time, or if the maintenance technician lacks experience.

Conventionally there has been a proposal for a technology wherein various types of data that can be acquired from the equipment are collected through providing this type of equipment with a wireless communication function and communicating with each piece of equipment wirelessly. (See, for example, Japanese Unexamined Patent Application Publication 2003-134261). In particular, in this technology there has been a proposal for providing a location detecting function, such as a GPS, on a piece of equipment and specifying the equipment by the detected horizontal-direction installation location.

However, in this type of conventional technology, no thought is given to the installation height of the equipment, and there is a problem in that it is not possible to specify precisely the installation location of equipment installed in a high location.

It in a relatively large facility, such as a petrochemical plant or a building, in some cases the equipment may be installed in a high location of 100 m or more, such as in a distillation tower or on a building rooftop, in addition to the scope of the facility being broad. Furthermore, there are also, in practice, cases wherein a maintenance technician actually servicing an applicable piece of equipment 42 will be at a workplace P having an arbitrary height.

Because of this, even if it is possible to know the location of the equipment in the horizontal directions, such as longitude and latitude, it might still not be possible to find the applicable equipment easily, requiring wasting of effort and time, prior to starting the actual maintenance work, to find the design drawings in order to find out the installation height.

The present invention is to solve problems such as this, and the object thereof is to provide a technology for displaying equipment information able to specify precisely the installation location of equipment installed in high locations.

SUMMARY OF THE INVENTION

In order to achieve such an object, the equipment management system according to the present invention includes an equipment management database wherein is stored equipment information regarding each piece of equipment installed in a facility, and a terminal device for displaying, on a screen, the installation location of an applicable piece of equipment based on the equipment information regarding any given piece of equipment, acquired from the equipment management database through a communication circuit. The equipment information of the equipment management database includes an installation height for the applicable equipment as location information for the location wherein the applicable equipment is installed; and the terminal device includes a height detecting unit for detecting the height of the device; and a location information displaying unit for acquiring, in response to a location information display request operation, equipment information for the applicable equipment from the equipment management database, and for displaying on a screen a differential height acquired by subtracting the current height of the device, detected by the height detecting unit, from the installation height of the equipment, which is included in the equipment information that has been acquired.

At this time, the terminal device may further have a location information recording unit for recording, in response to a location information recording request operation, the height detected by the height detecting unit, as the installation height for the applicable equipment, into the equipment information pertaining to the applicable equipment in the equipment management database.

Additionally, the location information recording unit may, in response to a floor height recording request operation, record a height detected by the height detecting unit, as a floor height for an installation reference floor wherein the applicable equipment is installed, to the equipment information pertaining to the applicable equipment in the equipment management database.

Furthermore, the location information displaying unit, in response to a location information display request operation, may acquire equipment information for the applicable equipment from the equipment management database and display on a screen a differential height acquired by subtracting the floor height of the applicable equipment that is included in the equipment information that has been acquired from the installation height for the applicable equipment that is included in the equipment information that has been acquired.

Additionally, the terminal device according to an example is connected to a communication circuit to the equipment management database that stores equipment information pertaining to each piece of equipment that is installed in the facility, and displays on a screen the installation location information for the applicable equipment based on the equipment information pertaining to a given piece of equipment acquired from the equipment management database. The terminal device includes a height detecting unit for detecting the height of the device; a location information displaying unit for acquiring, in response to a location information display request operation, equipment information for the applicable equipment from the equipment management database, and for displaying on a screen a differential height acquired by subtracting the current height of the device, detected by the height detecting unit, from the installation height of the equipment, which is included in the equipment information that has been acquired.

At this time a location information recording unit may also be provided for recording, in response to a location information recording request operation, the height detected by the height detecting unit, as the installation height for the applicable equipment, into the equipment information pertaining to the applicable equipment in the equipment management database.

Additionally, the location information recording unit may, in response to a floor height recording request operation, record a height detected by the height detecting unit, as a floor height for an installation reference floor wherein the applicable equipment is installed, to the equipment information pertaining to the applicable equipment in the equipment management database.

Furthermore, the location information displaying unit, in response to a location information display request operation, may acquire equipment information for the applicable equipment from the equipment management database and display on a screen a differential height acquired by subtracting the floor height of the applicable equipment that is included in the equipment information that has been acquired from the installation height for the applicable equipment that is included in the equipment information that has been acquired.

Additionally, a location information displaying method according to an example is used by a terminal device that is connected to a communication circuit to an equipment management database that stores equipment information pertaining to each piece of equipment that is installed in a facility, and that displays, on a screen, installation location information for applicable equipment based on the equipment information pertaining to any given equipment acquired from the equipment management database. The location information displaying method includes a step wherein a height detecting unit detects a height of the device; a step wherein a location information displaying unit acquires, from the equipment management database, equipment information for applicable equipment, in response to a location information display request operation; and a location information displaying step wherein a location information displaying unit displays, on a screen, a differential height acquired through subtracting, from the installation height of the applicable equipment that is included in the equipment information that is acquired, the current height of the device, detected in the height detecting step.

The present invention enables the accurate specification of the installation location of applicable equipment even when the applicable equipment is installed in a high location. This makes it possible to achieve extremely efficient maintenance through the ability to eliminate the wasted work and time that has conventionally been required prior to starting the actual maintenance work on the applicable equipment.

DETAILED DESCRIPTION OF THE PRESENT INVENTION

Examples of the present invention will be explained next in reference to the drawings.

Figure 1:
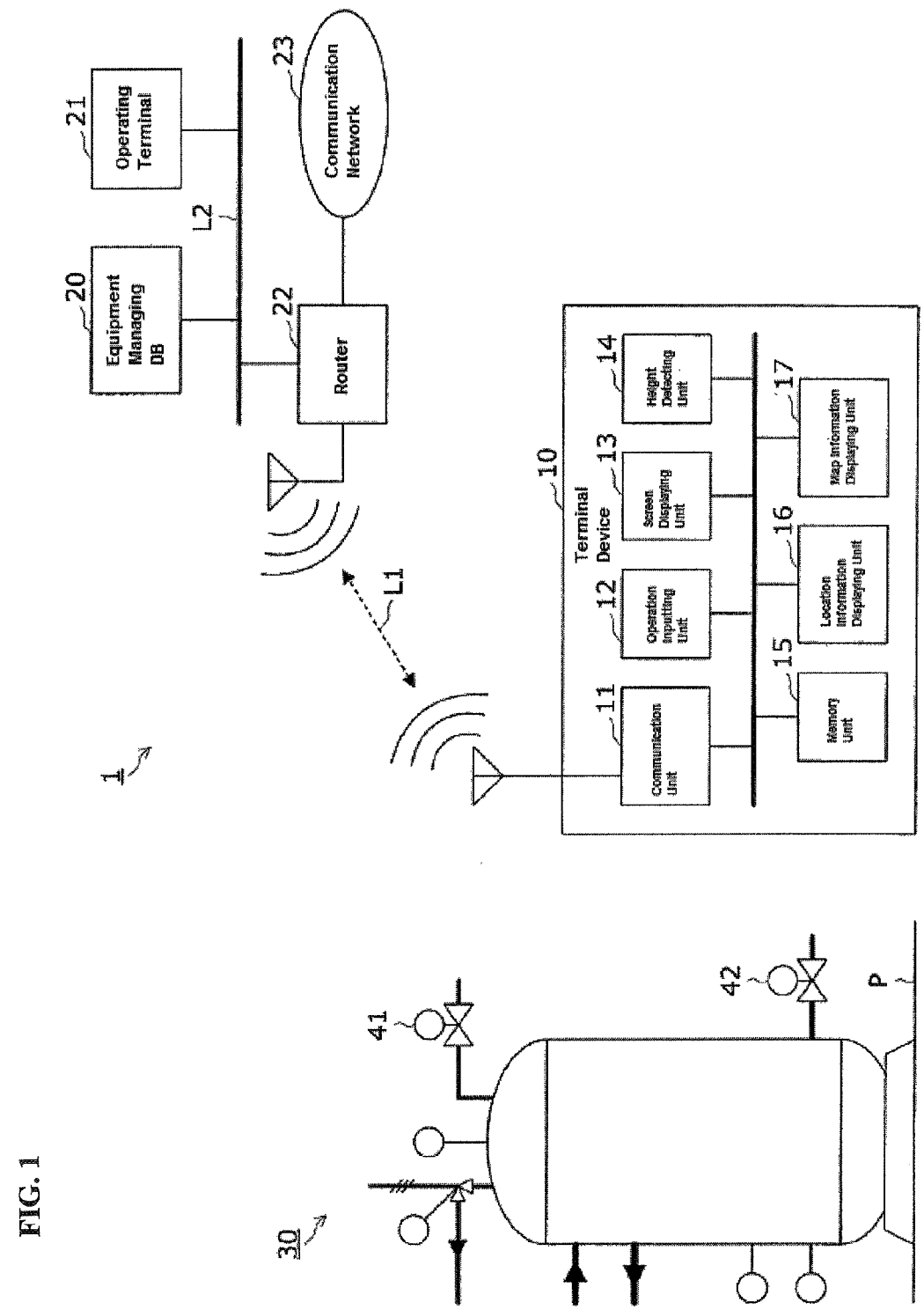
FIG. 1 is a block diagram illustrating the configuration of an equipment management system and a terminal device according to an example.

An equipment management system according to an example is explained first in reference to FIG. 1. FIG. 1 is a block diagram illustrating the configuration of an equipment management system and a terminal device according to an example.

An equipment management system 1 includes an equipment management database (hereinafter termed the "equipment management DB") 20 that stores equipment information pertaining to each piece of equipment 40 (41, 42) installed in a facility 30, and a terminal device 10 for displaying, on a screen, installation location information for applicable equipment based on equipment information pertaining to any given equipment, acquired from the equipment management DB 20 through a communication circuit L1.

The facility 30 may be, for example, an industrial system such as a petrochemical plant, a building, or the like, where there are various types of equipment, such as a piece of field equipment, a remote I/O, a power supply unit, a controller, an operator console, or the like, as specific examples of the equipment 40.

The equipment management DB 20 includes a server device, and has a function for storing, as the equipment information, various types of information pertaining to the applicable equipment, by the equipment ID of each piece of equipment 40.

An operating terminal 21 that is operated by an operator, and a router 22, which relays data communications with the terminal device 10, are connected to a communication circuit L2 to the equipment management DB 20. Furthermore, a communication network 23, as typified by the Internet, is connected to the router 22, enabling access to the communication network 23 from the operating terminal 21 and the terminal device 10.

Figures 2, 3:
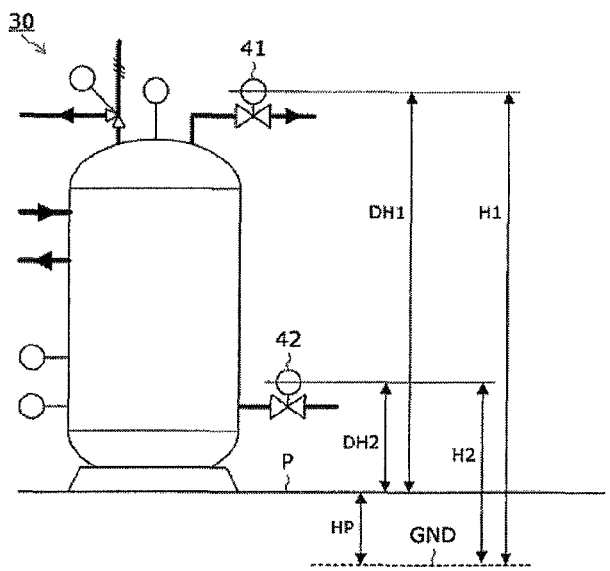
FIG. 2 is an explanatory diagram illustrating the height of a piece of equipment.
FIG. 3 is an example of the structure of the equipment information.

The principle of the present invention is explained next in reference to FIG. 2. FIG. 2 is an explanatory diagram illustrating the height of a piece of equipment.

Generally the height detected by an air pressure altimeter or a GPS is known as an absolute altitude, and is the elevation from a height reference point GND, wherein the altitude above sea level is 0 m, where the installation height H wherein the equipment 41 is installed is detected as an installation height H1, and the height wherein the equipment 42 is installed is detected as an installation height H2.

On the other hand, when specifying the installation location of the equipment 40 when a maintenance technician is to perform maintenance, usually the equipment 40 is specified from a workplace P having an arbitrary height, such as the ground level that is an installation reference for the facility 30, the floor whereon the equipment 40 is installed, or the like. In the present invention, the elevation of the equipment 40, using the workplace P as a reference, is termed the differential height DH. In FIG. 2, the differential height of the equipment 41, wherein the facility 30 is located at the workplace P, is DH1, and the differential height of the equipment 42 is DH2.

The present form of embodiment focuses on the fact that it is possible to calculate the differential heights DH1 and DH2 from the differences of the installation heights H1 and H2, or in other words, DH1=H1−HP and DH2=H2−HP, if the current height HP, which indicates the height of the workplace P relative to the height reference point GND, is known, where a height detecting unit 14 is provided in a terminal device 10 to detect the current height HP of the workplace P, to calculate the differential heights DH1 and DH2 of the equipment 41 and 42 by subtracting the current height HP from the heights H1 and H2 included in the equipment information acquired from the equipment management DB 20.

That is, in the present example the installation height H, which is an elevation, is included as the installation location information for the installation of the equipment 40 in the equipment information in the equipment management DB 20, and, in response to a location information display request operation, the terminal device 10 acquires the equipment information for the applicable equipment 40 from the equipment management DB 20, and displays, on a screen, the differential height DH acquired by subtracting the current height HP, detected by the device, from the installation height H of the equipment 40, which is included in the equipment information that is acquired.

The structure of the terminal device 10 according to an example is explained in detail next in reference to FIG. 1.

The terminal device 10 includes an information processing terminal such as a personal computer, a PDA, a mobile phone, or the like, and it has, as its primary functional units, a communications unit 11, an operation inputting unit 12, a screen displaying unit 13, a height detecting unit 14, a memory unit 15, a location information displaying unit 16, and a map information displaying unit 17, which are mutually connected to enable the exchange of data.

The communication unit 11 includes a dedicated communication circuit, and has the function of exchanging equipment information and various types of messages through performing data communication with the equipment management DB 20 through a communication circuit L1, which is either wireless or wired, a router 22, and a communication circuit L2.

The operation inputting unit 12 has an operation inputting device such as a keyboard, and has the function of detecting a location information display request operation and a location information recording request operation, along with various types of operations by the operator, such as a data inputting operation.

The screen displaying unit 13 includes a screen display device such as an LCD, and has functions for displaying an operating menu, along with various types of information such as the height information and map information, and the like, outputted from the location information displaying unit 16 and the map information displaying unit 17.

The height detecting unit 14 has an altimeter such as an air pressure altimeter, and has the function of detecting, as the height, the elevation of the device.

The memory unit 15 includes a memory device such as a semiconductor memory or a hard disk, and has the function of storing the various types of process information and programs used in the processing operations for the various functional units.

The location information displaying unit 16 has a function for acquiring, from the equipment management DB 20, equipment information for applicable equipment having an equipment ID that is specified by an applicable operation, in response to a location information display request operation detected by the operation inputting unit 12, and has a function for displaying, on a screen of the screen displaying unit 13, the differential height DH acquired by subtracting the current height HP of the device, detected by the height detecting unit 14, from the applicable installation height H.

FIG. 3 is an example of a structure of the equipment information. Here, for each unique equipment ID (identification information) for a piece of equipment 40, a node number and segment number which indicate the management segment that includes the equipment 40, a node address of the equipment 40 in the facility management network system, and installation location information for the equipment 40 are recorded. Furthermore, the longitude, latitude, and installation height (elevation) H are recorded as the installation location information 50 for the equipment 40. This installation height H is detected by, for example, an altimeter held by an operator when, for example, the equipment 40 is installed, or is detected by an altimeter that is equipped within the equipment 40, and is recorded as equipment information, together with the longitude and latitude detected by a location detecting device, such as a GPS.

The map information displaying unit 117 has a function for acquiring, from the equipment management DB 20, through the communications network 23, or from the memory unit 15, map information corresponding to the installation location information, such as the longitude and latitude, included in the equipment information for the applicable equipment, acquired by the location information displaying unit 16, and a function for displaying, onto the screen of the screen displaying unit 13, the map that has been acquired together with the installation height H and differential height DH that are displayed by the location information displaying unit 16.

Figure 4:
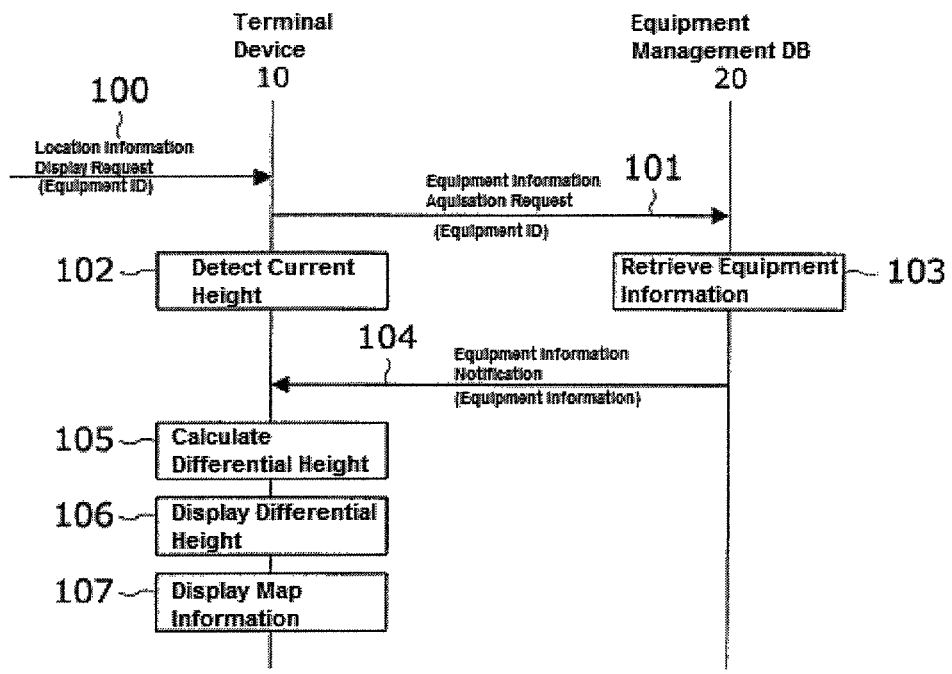
FIG. 4 is a sequence diagram illustrating the location information displaying operation of the equipment management system according to the example.

The operation of the equipment management system according to an example of the present invention is explained next in reference to FIG. 4. FIG. 4 is a sequence diagram illustrating the location information displaying operation of the equipment management system according to the example.

The location information displaying operation is explained for a case wherein the maintenance technician has performed a location information display request operation for the equipment information of the applicable equipment 42, in order to specify the installation location of the applicable equipment 42, using the terminal device 10, where the terminal device 10 is installed in a workplace P of a facility 30 wherein the applicable equipment 42 is installed.

First in the terminal device 110, in response to a location information display request operation detected by the operation inputting unit 12 (Step 100), the location information displaying unit 16 sends, from the communication unit 11 to the equipment management DB 20, an equipment information acquisition request that includes the equipment ID for the applicable equipment 42, specified by this operation (Step 101).

This equipment information acquisition request is received by the router 22 from the communication unit 11 through the wireless or wired communication circuit L1, and is forwarded to the equipment management DB 20 through the communication circuit L2.

The equipment management DB 20, in response to the equipment information acquisition request from the terminal device 10, retrieves the equipment information for the equipment 42 that corresponds to the equipment ID specified in the request (Step 103), and returns to the terminal device 10 an equipment information notification that includes the equipment information that has been acquired (Step 104).

This equipment information notification is received by the communication unit 11 through the opposite route from that of the equipment information acquisition request, that is, it is forwarded to the terminal device 10 through the communication circuit L2, the router 22, and the communication circuit L1.

Then the location information displaying unit 16 of the terminal device 10 not only sends an equipment information acquisition request in response to a location information display request operation, but also detects the height wherein the device is located, or in other words, detects the current height HP of the workplace P, by the height detecting unit 14 (Step 102).

Thereafter, the location information displaying unit 16, in response to the receipt of the equipment information notification by the communication unit 11, calculates the height of the equipment 42 relative to that of the workplace P through subtracting the current height HP from the installation height of the equipment 42 that was included in the equipment information for the equipment 42 that was received from the equipment management DB 20, or in other words, calculates the differential height DH2=H2−HP (Step 105).

Following this, the location information displaying unit 16 displays on the screen of the screen displaying unit 13 the equipment information for the equipment 42 that has been acquired from the equipment management DB 20, including the differential height DH2 of the equipment 42 and also the installation height H2 of the equipment 42. (Step 106). At this time, an equipment symbol, such as a circle that indicates the equipment 42, may be displayed at the coordinate location on the screen in accordance with the horizontal-direction location included in the equipment information for the equipment 42, and a notation symbol, such as a balloon, may be associated with the equipment symbol to display the equipment information for the equipment 42, including the installation height H2.

Furthermore, the map information displaying unit 17 displays, on the screen displaying unit 13, map information relating to the vicinity of the installation location of the equipment 42, based on the installation location information in the equipment information for the equipment 42, such as the longitude and latitude thereof, is acquired from the equipment management DB 20, the communication network 23, or the memory unit 15, and is displayed combined with an underlayer of the equipment information that is displayed on the screen by the location information displaying unit 16 (Step 107). completing the sequence of the location information displaying operation.

Figure 5:
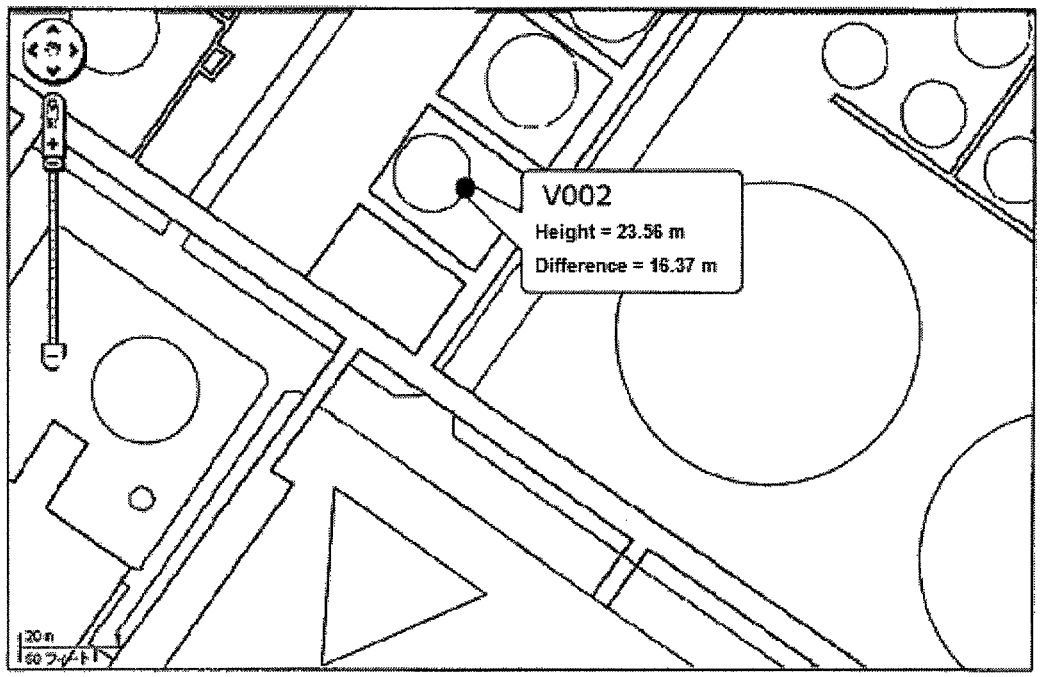
FIG. 5 is an example of a screen display of the equipment information.

FIG. 5 is an example of a screen display for the equipment information. Here the equipment information relating to the equipment 42 is displayed on the screen, wherein, in the case wherein the installation height H2 of the equipment 42 is 23.56 m and the current height HP of the device, detected by the device 10, is 7.19 m, the differential height of the equipment 42 is DH2=H2−HP=16.37 m.

Consequently, the notation symbol wherein is noted "V002," which indicates the equipment ID of the equipment 42, the "Height=23.56," which indicates the installation height H2 of the equipment 42, and the "Difference=16.37," which indicates the differential height DH2 of the equipment 42 is written, is displayed on the screen in relation to the equipment symbol, which is a black circle indicating the horizontal-direction location of the equipment.

In this way, in the present example, equipment information that includes the installation height H, which comprises an elevation, is stored as location information of the installation of the equipment 40, as equipment information, in the equipment management DB 20, and in response to a display request operation, the equipment information of the applicable equipment 40 is acquired from the equipment management DB 20 by the location information displaying unit 16 within the terminal device 10, and the differential height DH, acquired by subtracting the current height HP of the device, detected by the height detecting unit 14 within the terminal device 10 from the installation height H of the equipment 40, which is included in the equipment information that has been acquired, is displayed on the screen of the screen displaying unit 13.

This makes it possible to specify precisely the installation location of the applicable equipment 40, through being able to understand easily the differential height DH from the workplace P to the applicable equipment 40, even when the applicable equipment 40 is installed in a high location and even when the maintenance technician who is to service the applicable equipment 40 is in a workplace P that has an arbitrary height RP.

Because of this, it is possible to achieve extremely efficient maintenance because it is possible to eliminate the wasted work and time that has conventionally been required prior to the start of the actual maintenance on the applicable equipment 40.

Note that while the present example explained a case wherein both the installation height H and the differential height DH of the applicable equipment 40 were displayed on the screen at the same time, as illustrated in FIG. 5, there is no limitation thereto in the screen displaying method. For example, either the installation height H or the differential height DH may be selected in accordance with a display switching operation detected by the operation inputting unit 12, and the height HP of the workplace P may be displayed as well.

Figure 6:
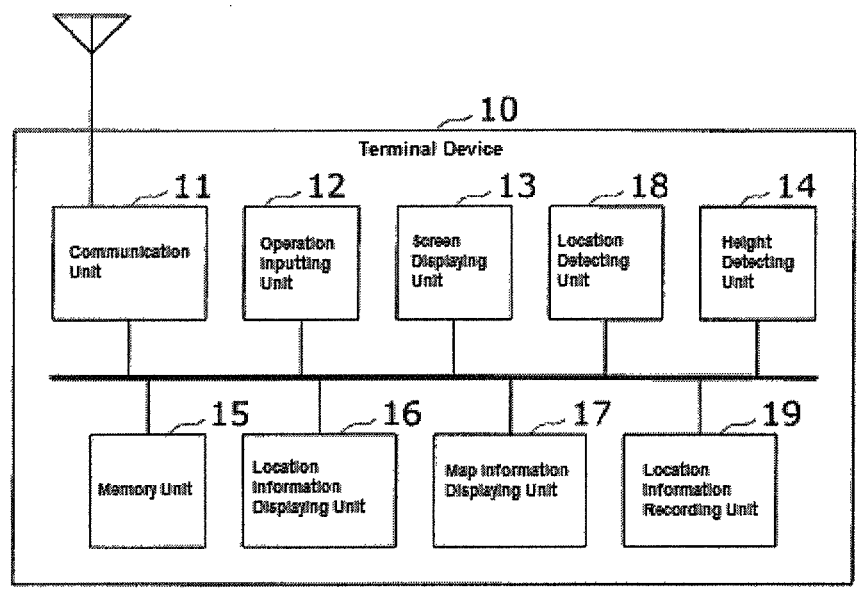
FIG. 6 is a block diagram illustrating the structure of a terminal device according to another example.

Another example is explained next in reference to FIG. 6, FIG. 6 is a block diagram illustrating a structure of a terminal device according to the example.

In the above example, a case was explained wherein the installation height of the equipment information that is stored in the equipment management DB 20 was detected using an altimeter, or the like, that was held by the operator at the time of the installation of the equipment 40, or detected by an altimeter that is equipped in the equipment 40, and the installation height was recorded in the equipment information together with the longitude and latitude similarly detected by a location detecting device, such as a GPS.

In the present example, a case is explained wherein the height detecting unit 14 that is equipped in the terminal device 10 is used to record the current height, detected by the height detecting unit 14 of the terminal device 10 when the operator hods the terminal device 10 at the time of installation of the equipment 40, for example, as the installation height H of the equipment 40, into the equipment information in the equipment management DB 20.

In this example, the location detecting unit 18 includes a location detecting device such as a GPS, and has the function of detecting, as the current location of the device, the horizontal-direction location of the terminal device 10 comprising, for example, a longitude and a latitude.

A location information recording unit 19 has a function for recording the current height, detected by the height detecting unit 14, as well as the current location of the device, detected by the location detecting unit 18, into the equipment information pertaining to the applicable equipment 42 in the equipment management DB 20, and also for recording the installation height H of the applicable equipment as the installation location, in response to a location information recording request operation detected by the operation inputting unit 12.

Note that the other structures in the terminal device 10 and the equipment management system 1 in this example are identical to those in the previous example, and thus detailed explanations thereof will be omitted.

Figure 7:
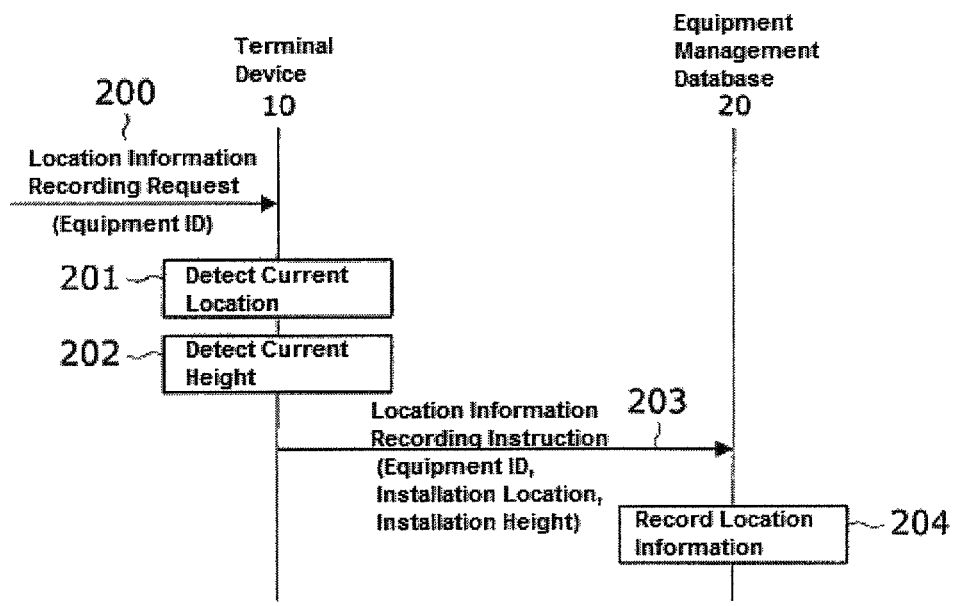
FIG. 7 is a sequence diagram illustrating the location information recording operation in the equipment management system according to the example.

The operation of the equipment management system in this example is explained next in reference to FIG. 7. FIG. 7 is a sequence diagram illustrating the location information recording operation of the equipment management system according to this example.

Here, the explanation is for the location information recording operation in a case wherein the maintenance technician holds the terminal device 10 at the time of the installation of the applicable equipment 42, and the current height and current location of the device, detected by the terminal device 10, are recorded into the equipment information of the equipment management DB 20 as the installation height H and installation location of the equipment 40.

In the terminal device 10, first, in response to a location information recording request operation detected by the operation inputting unit 12 (Step 200), the location information recording unit 19 not only detects the current location of the device in the horizontal directions through the location detecting unit 18 (Step 201), but also detects the current height H of the device through the height detecting unit 14 (Step 202). Thereafter, the location information recording unit 19 sends, from the communication unit 11 to the equipment management DB 20, a location information recording request that includes the equipment ID of the applicable information 42, which is specified by the location information recording request operation, along with the installation location of the applicable equipment 42, from the current location of the device, and the location height H of the applicable equipment 42, from the current height of the device (Step 203).

The equipment management DB 20, in response to the location information recording request from the terminal device 10, sets the installation location and installation height H that are included in the request into the equipment information for the equipment 42 that corresponds to the equipment ID that is specified in the request (Step 204), to thereby complete the sequence of the location information recording operation.

In the present example, the height detected by the height detecting unit 14 is recorded, as the installation height H of the applicable equipment 42, into the equipment information pertaining to the applicable equipment 42 in the equipment management DB 20 by the location information recording unit 19 of the terminal device 10 in response to a location information recording request operation, as described above, and thus it is possible to record the location height of the equipment 40 into the equipment information in the equipment management DB 20 with extreme ease through the use of the terminal device 10 that displays of the height of the equipment 42, without requiring any other equipment, such as an altimeter.

A further example is explained next.

In the above example, an explanation was given using, as an example, a case where in the installation height and installation location of the equipment 40 was recorded into the equipment information in the equipment management DB 20 using the terminal device 10. Here this structure is able to record also, into the equipment information, a floor height FP of an installation reference floor for the equipment 40, rather than being limited to the installation height H of the equipment 40. If, for example, the equipment 40 is installed in a facility such as a distillation tower that uses the ground level as its foundation, the ground level would serve as the installation reference floor for the equipment 40, and if the equipment 40 were installed on the roof of a building, then the floor level of the roof would serve as the installation reference floor for the equipment 40.

In the present example, a case is explained wherein the installation height and the floor height FP of the equipment 40 is recorded, from this perspective, into the equipment information of the equipment management DB 20, and, in response to a location information display request by the terminal device 10, a differential height is calculated and displayed from the installation height and the floor height FP in the equipment information acquired from the equipment management DB 20.

Figures 8, 9:
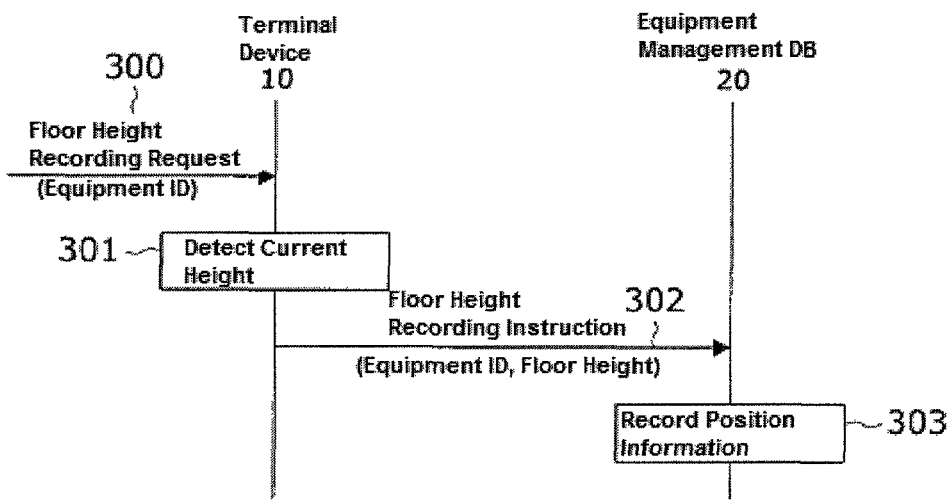
FIG. 8 is an example of another structure for the equipment information.
FIG. 9 is a sequence diagram of the floor height recording operation in the equipment management system according to a further example.

FIG. 8 is an example of another structure for the equipment information. Here, for each unique equipment ID (identification information) for a piece of equipment 40, a node number and segment number which indicate the management segment that includes the equipment 40, a node address of the equipment 40 in the facility management network system, and installation location information for the equipment 40 are recorded. Additionally, the floor height of the equipment 40 is recorded in addition to the longitude, latitude, and installation height (elevation) as the installation location information 50 for the equipment 40.

In the present form of embodiment, the location information recording unit 19 has a function for recording the height detected by the height detecting unit 14 as the floor height for the applicable equipment into the equipment information pertaining to the applicable equipment 42 in the equipment management DB 20, in response to a floor height recording request operation detected by the operation inputting unit 12.

Note that the other structures in the terminal device 10 and the equipment management system 1 in the present form of embodiment are identical to those in the first form of embodiment, so detailed explanations thereof will be omitted.

The operation of the equipment management system is explained in reference to FIG. 9. FIG. 9 is a sequence diagram illustrating the floor height recording operation in the equipment management system according to the above example.

Here the explanation is for the floor height recording operation in a case wherein the height detected by the terminal device 10, at the workplace P in the facility 30 wherein the applicable equipment 42 is installed, is recorded into the equipment information of the equipment management DB 20 as the floor height of the equipment 40.

In the terminal device 10, first, in response to a floor height recording request operation detected by the operation inputting unit 12 (Step 300), the location information recording unit 19 detects the current height H of the device through the height detecting unit 14 (Step 202). Thereafter, the location information recording unit 19 sends, from the communication unit 11 to the equipment management DB 20, a floor height recording request that includes the equipment ID of the applicable equipment 42, which is specified by the floor height recording request operation, along with the floor height of the applicable equipment 42, from the current height of the device (Step 302).

The equipment management DB 20, in response to the floor height recording request from the terminal device 10, sets the floor height that is included in the request into the equipment information for the equipment 42 that corresponds to the equipment ID that is specified in the request (Step 303), to thereby complete the sequence of the floor height recording operation.

Figure 10:
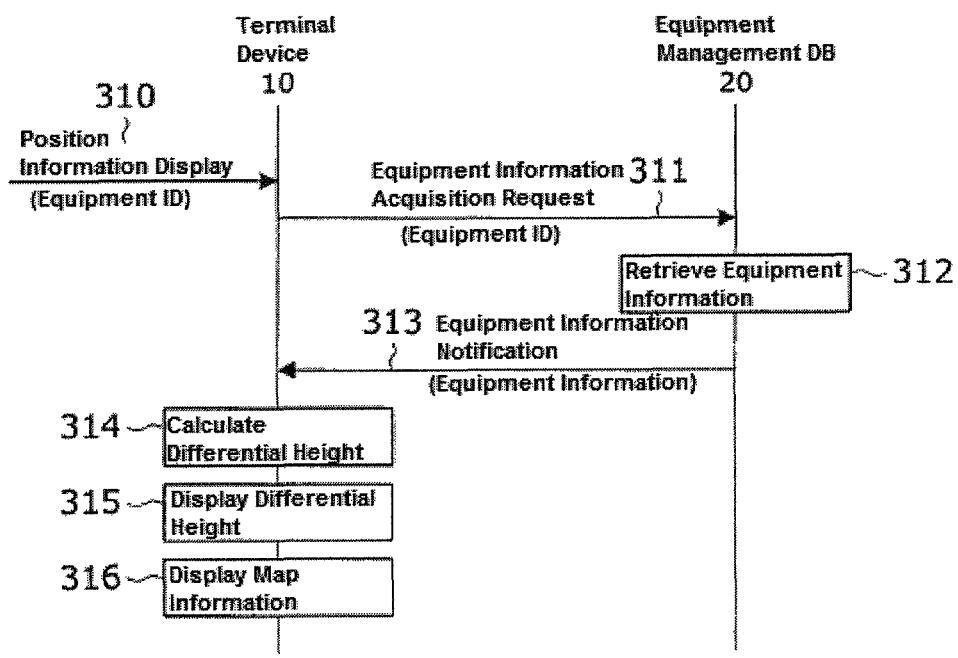
FIG. 10 is a sequence diagram illustrating the location information recording operation in the equipment management system according to the example.

The position information displaying operation of the equipment managing system according to the present example is explained next in reference to FIG. 10. FIG. 10 is a sequence diagram illustrating the location information displaying operation of the equipment management system according to the further example. The location information displaying operation is explained for a case wherein the maintenance technician has performed a location information display request operation for the equipment information of the applicable equipment 42, in order to specify the installation location of the applicable equipment 42, using the terminal device 10.

First, in the terminal device 110, in response to a location information display request operation detected by the operation inputting unit 12 (Step 310), the location information displaying unit 16 sends, from the communication unit 11 to the equipment management DB 20, an equipment information acquisition request that includes the equipment ID for the applicable equipment 42, specified by this operation (Step 311). The equipment management DB 20, in response to the equipment information acquisition request from the terminal device 10, retrieves the equipment information for the equipment 42 that corresponds to the equipment ID specified in the request (Step 312), and returns to the terminal device 10 an equipment information notification that includes the equipment information that has been acquired (Step 313).

In the terminal device 10, the location information displaying unit 16, in response to the receipt of the equipment information notification by the communication unit 11, calculates the height of the equipment 42 relative to that of the workplace P through subtracting the floor height FP of the equipment 42, included in the equipment information, from the installation height H2 of the equipment 42 that was included similarly in the equipment information for the equipment 42 that was received from the equipment management DB 20, or in other words, calculates the differential height DH2=H2−FP (Step 314).

Following this, the location information displaying unit 16 displays on the screen of the screen displaying unit 13 the equipment information for the equipment 42 that has been acquired from the equipment management DB 20, including the differential height DH2 of the equipment 42 and also the installation height H2 of the equipment 42. (Step 315). At this time, an equipment symbol, such as a circle that indicates the equipment 42, may be displayed at the coordinate location on the screen in accordance with the horizontal-direction location included in the equipment information for the equipment 42, and a notation symbol, such as a balloon, may be associated with the equipment symbol to display the equipment information for the equipment 42, including the installation height H2.

Furthermore, the map information displaying unit 17 displays, on the screen displaying unit 13, map information relating to the vicinity of the installation location of the equipment 42, based on the installation location information in the equipment information for the equipment 42, such as the longitude and latitude thereof. This is acquired from the equipment management DB 20, the communication network 23, or the memory unit 15, and is displayed combined with an underlayer of the equipment information that is displayed on the screen by the location information displaying unit 16 (Step 316). This completes the sequence of the location information displaying operation.

In this way, in the above example the installation height and the floor height of the equipment 40 is recorded into the equipment information in the equipment management DB 20 using the terminal device 10, and the differential height is calculated from the installation height and floor height FP of the equipment information acquired from the equipment management DB 20, and are displayed, in response to a location information display request, using the terminal device 10.

As a result, it is possible to record the installation height and floor height of the equipment 40 into the equipment information of the equipment management DB 20 with extreme ease using the terminal device 10 that displays the height of the equipment 42, without requiring any other equipment, such as an altimeter. Furthermore, because the installation height and the floor height of the equipment 40 is recorded in the equipment information in the equipment management database DB 20, it is possible to display the differential height of any given equipment 40 on a device other than the terminal equipment 10, for example, the operating terminal 21.

Note that while in the this example the explanation used, as an example, a case wherein the floor height detected by the terminal device 10 was recorded as-is into the equipment information of the equipment management DB 20 and the differential height between the installation height and the floor height in the equipment information acquired from the equipment management DB 20 was calculated at the time of displaying the height, there is no limitation thereto.

For example, the differential height may be calculated from the installation height and the floor height relating to the same equipment ID, provided from the terminal device 10, in the equipment management DB 20, and then stored into the equipment information. Doing so eliminates the need to perform the differential height calculation at the time of displaying the height. Conversely, after the differential height is calculated from the installation height and the floor height for the same equipment ID in the terminal device 10, it may then be stored into the equipment information in the equipment management DB 20. In this case, the installation height of the equipment need not be acquired again from the equipment management DB 20 at the time of the calculations, but rather that which has been detected earlier point by the height detecting unit 14 and stored in the memory unit 15 may be used.

While the present invention was explained referencing the examples set forth above, the present invention is not limited to the examples set forth above. The structures and details of the present invention may be modified in a variety of ways based on the understanding of those skilled in the art within the scope of the present invention.

The invention claimed is:

1. An equipment managing system comprising:
   an equipment management database that stores equipment information pertaining to each piece of equipment that is installed in a facility; and
   a terminal device that displays, on a screen, installation location information for an applicable equipment based on the equipment information pertaining to a given piece of equipment acquired through a communication circuit from the equipment management database,
   wherein the equipment information of the equipment management database includes an installation height for the applicable equipment as location information for the location wherein the applicable equipment is installed, and
   wherein said terminal device is provided separately from the applicable equipment and comprises:
     a height detecting unit detecting the height of the device; and
     a location information displaying unit acquiring, in response to a location information display request operation, equipment information for the applicable equipment from the equipment management database, and displaying on a screen a differential height acquired by subtracting the current height of the device, detected by the height detecting unit, from the installation height of the equipment, which is included in the equipment information that has been acquired, and
       wherein the location information displaying unit acquires, in response to a location information display request operation, equipment information for the applicable equipment from the equipment management database and display on a screen a differential height acquired by subtracting a floor height of the applicable equipment that is included in the equipment information that has been acquired from the installation height for the applicable equipment that is included in the equipment information that has been acquired.

2. The equipment managing system as set forth in claim 1, wherein:
   the terminal device further comprises a location information recording unit recording, in response to a location information recording request operation, the height detected by the height detecting unit, as the installation height for the applicable equipment, into the equipment information pertaining to the applicable equipment in the equipment management database.

3. The equipment managing system as set forth in claim 2, wherein:
   the location information recording unit records, in response to a floor height recording request operation, the height detected by the height detecting unit, as the floor height for the installation reference floor whereon is installed applicable equipment, into the equipment information pertaining to the applicable equipment in the equipment management database.

4. The equipment managing system as set forth in claim 1, wherein the installation height of the applicable equipment is detected by the height detecting unit of the terminal device provided separately from the applicable equipment.

5. The equipment managing system as set forth in claim 4, wherein
   the installation height of the applicable equipment is detected by the terminal device held by an operator when the applicable equipment is installed in the facility.

6. A terminal device connected by a communication circuit to an equipment management database that stores equipment information pertaining to each piece of equipment that is installed in a facility, and that displays on a screen the installation location information for an applicable equipment based on the equipment information pertaining to a given piece of equipment acquired from the equipment management database; comprising:
   a height detecting unit detecting the height of the device; and
   a location information displaying unit acquiring, in response to a location information display request operation, equipment information for the applicable equipment from the equipment management database, and displaying on a screen a differential height acquired by subtracting the current height of the device, detected by the height detecting unit, from the installation height of the equipment, which is included in the equipment information that has been acquired,
   wherein the terminal device is provided separately from the applicable equipment, and
   wherein the location information displaying unit acquires, in response to a location information display request operation, equipment information for the applicable equipment from the equipment management database and display on a screen a differential height acquired by subtracting a floor height of the applicable equipment that is included in the equipment information that has been acquired from the installation height for the applicable equipment that is included in the equipment information that has been acquired.

7. The terminal device as set forth in claim 6, further comprising:
   a location information recording unit recording, in response to a location information recording request operation, the height detected by the height detecting unit, as the installation height for the applicable equipment, into the equipment information pertaining to the applicable equipment in the equipment management database.

8. The terminal device as set forth in claim 7, wherein:
   the location information recording unit records, in response to a floor height recording request operation, the height detected by the height detecting unit, as the floor height for the installation reference floor whereon is installed applicable equipment, into the equipment information pertaining to the applicable equipment in the equipment management database.

9. The terminal device as set forth in claim 6, wherein the installation height of the applicable equipment is detected by the height detecting unit of the terminal device provided separately from the applicable equipment.

10. The terminal device as set forth in claim 9, wherein
    the installation height of the applicable equipment is detected by the terminal device held by an operator when the applicable equipment is installed in the facility.

11. A location information displaying method that is used by a terminal device that is connected to a communication circuit to an equipment management database that stores equipment information pertaining to each piece of equipment that is installed in a facility, and that displays on a screen the installation location information for an applicable equipment based on the equipment information pertaining to a given piece of equipment acquired from the equipment management database, the method comprising the steps of:

providing the terminal device separately from the applicable equipment, the terminal device having a height detecting unit and a location information displaying unit;

detecting a height of the device with the height detecting unit;

acquiring, from the equipment management database, equipment information for applicable equipment, in response to a location information display request operation, by the location information displaying unit; and displaying, on a screen of the location information displaying unit, a differential height acquired through subtracting, from the installation height of the applicable equipment that is included in the equipment information that is acquired, a floor height and the current height of the device, detected in the height detecting step.

12. The location information displaying method as set forth in claim 11, further comprising the step of:

detecting the installation height of the applicable equipment by the height detecting unit of the terminal device provided separately from the applicable equipment.

13. The location information displaying method as set forth in claim 12, wherein the installation height of the applicable equipment is detected by the terminal device held by an operator when the applicable equipment is installed in the facility.

* * * * *